Nov. 28, 1961   J. O. MELTON ET AL   3,010,733
IDLER ARM BEARING AND ASSEMBLY
Filed Sept. 24, 1959   2 Sheets-Sheet 2

INVENTORS
JAMES O. MELTON &
THOMAS B. WILKINSON
BY
ATTORNEY

United States Patent Office 3,010,733
Patented Nov. 28, 1961

3,010,733
IDLER ARM BEARING AND ASSEMBLY
James O. Melton, Norman, and Thomas B. Wilkinson, Oklahoma City, Okla., assignors to Jamco, Inc., Oklahoma City, Okla., a corporation of Oklahoma
Filed Sept. 24, 1959, Ser. No. 842,016
8 Claims. (Cl. 280—95)

This invention relates to pivotable bearing means, and more particularly, but not by way of limitation, to improvements in vehicular steering gear idler arm assemblies.

Most automobiles, as maanufactured today, utilize a cross rod or drag link connecting the steering mechanisms of the left and right front wheels. The left extremity of the cross rod is usually supported by a crank arm affixed to the steering column. In order to improve steering performance it has been found advisable to support the right extremity of the cross rod. This is accomplished by the use of an idler arm which must be pivotally supported to the frame of the automobile.

In order to have a minimum steering effort on the part of the automobile driver, the idler arm must pivot with a minimum of friction and relative movement. An existing method of providing reduced friction requires mechanisms using ball or roller bearings. This has resulted in improved steering performances in automobiles, but incorporates some disadvantageous features. For instance, the steering mechanism located as it is, in the exposed underneath portion of an automobile, is constantly subjected to large quantities of water, mud and dust. These deleterious substances implacably enter the metal bearings, resulting in reduced life and deteriorating the performance of the bearing mechanism. Also, metal bearings require frequent lubrication. If the bearing is not lubricated, through error or oversight, the usefulness of the bearing can be completely destroyed in a relatively short time.

It is therefore an object of this invention to overcome the objections in existing idler arm bearings.

Another object of this invention is to provide an idler arm bearing which is resistant to the harmful effects of water, mud and dust.

Another object of this invention is to provide an idler arm bearing which does not require lubrication.

Another object of this invention is to provide an idler arm bearing which produces a minimum of friction, thereby reducing the effort required in automobile steering.

Another object of this invention is to provide an idler arm bearing which will retain accurate alignment of the automobile steering mechanism for a longer period of time.

A still further object of this invention is to provide an idler arm bearing which will be relatively inexpensive to manufacture, and which can be easily and quickly installed on the automobile.

These and other objects, and a better understanding of this invention may be had by referring to the attached description and claims, taken in conjunction with the drawings, of which:

Figure 1:
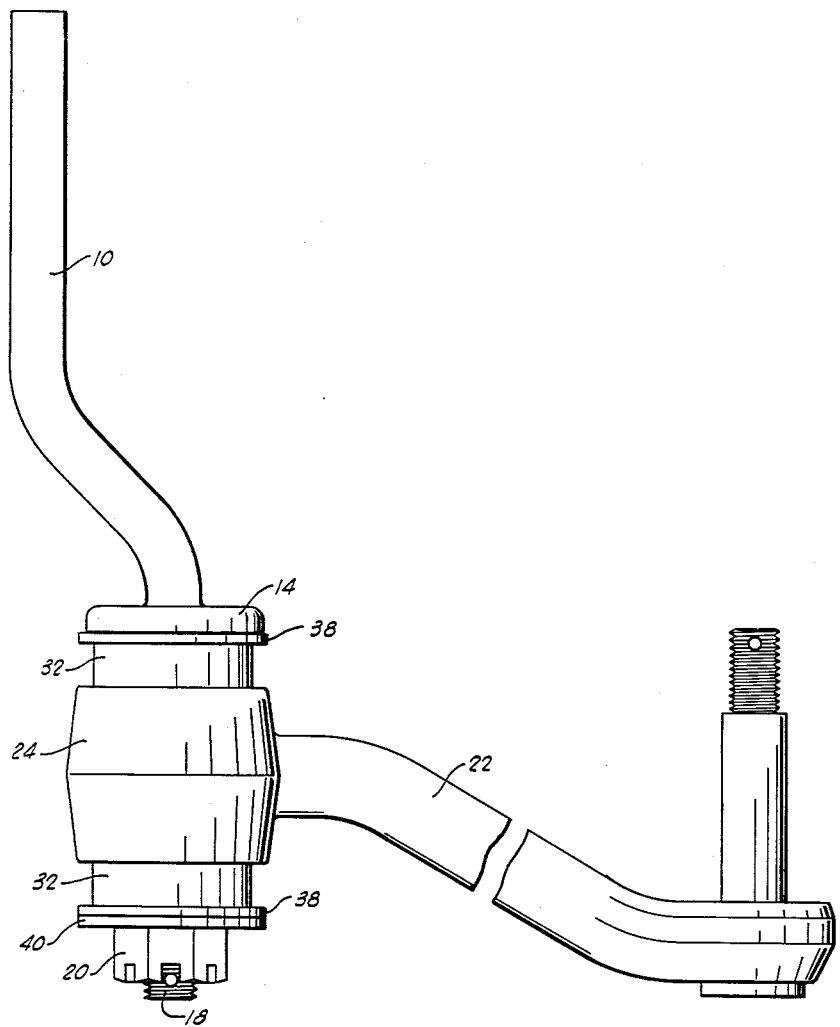
FIGURE 1 is a side elevation of a supporting bracket, idler arm, and bearing assembly according to this invention.
Figure 2:
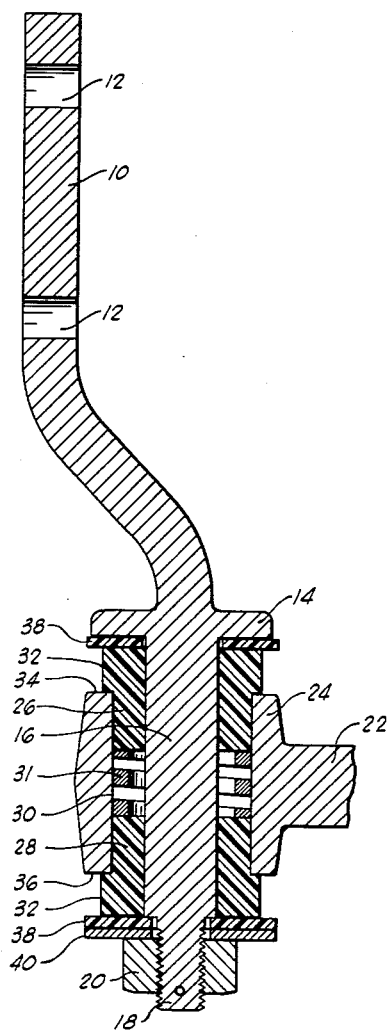
FIGURE 2 is a vertical cross sectional view of the structure shown in FIG. 1.
Figure 3:
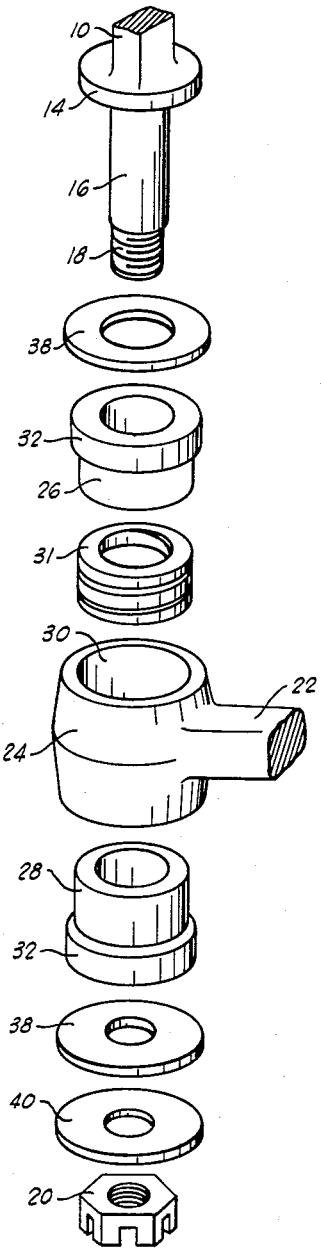
FIGURE 3 is an exploded view showing the several elements detached from each other and in the relationship as shown in FIGS. 1 and 2.

Referring to the drawings in detail, and particularly FIGS. 1 and 2, reference character 10 designates a bracket having suitable bolt holes 12 for connection of the bracket to the frame of an automobile or the like (not shown). The bracket 10 is also provided with a circumferential flange 14 and a smooth-surfaced spindle portion 16 extending downwardly below the flange 14. The lower end 18 of the spindle 16 is threaded to receive a nut 20 and maintain the various elements in assembly, as will be described.

An idler arm 22 having a tubular hub portion 24 is pivotally supported on the spindle 16 by a novel bearing assembly which includes upper and lower bearing sleeves 26 and 28 formed out of a high density synthetic resin material, as will be described. Each of the sleeves 26 and 28 is of a size to fit tighter in the bore 30 of the hub 24 than around the spindle 16 to promote rotation of the sleeves with the idler arm 22 during operation of the device and efficiently journal the idler arm on the spindle. However, the sleeves 26 and 28 should fit sufficiently loose in the bore 30 to be moved outwardly by action of a helical compression spring 31 positioned in the bore 30 and bearing against the inner ends of the sleeves when parts become worn, as will be described. The fit of the sleeves 26 and 28 on the spindle 16 may be described as a sliding fit, while the fit of the sleeves in the bore 30 is slightly tighter and may be described as a tight sliding fit. It should also be noted that a circumferential flange 32 is formed on the outer end portion of each of the bearing sleeves 26 and 29 and is larger in diameter than the bore 30 to contact the upper and lower faces 34 and 36 of the hub 24, such that the bearing sleeves will not be completely telescoped into the idler arm hub during assembly or operation of the device.

High density synthetic resin bearing washers 38 are provided above the upper bearing sleeve 26 and below the lower bearing sleeve 28 to cooperate with the bearing sleeves in journalling the idler arm 22 on the spindle 16, as will be described. The upper bearing washer 38 bears against the flange 14 and the lower bearing washer 38 bears against a metal washer 40 held on the spindle by the nut 20.

As previously indicated, bearing sleeves 26 and 28 and bearing washers 38 are composed of high density synthetic resin materials. Some of the materials which have proven satisfactory include: polymerized olefins, such as a polyethylene sold under the trade name "Marlex"; polymerized tetrafluoroethylene, such as sold under the trade name "Teflon," and long chain synthetic polymeric amides, such as sold under the trade name "nylon." In practice it has been found that particularly good and economical results are obtained when the bearing sleeves 26 and 28 are made of polymerized ethylene, with bearing washers 38 made of a long chain polymeric amide. This is due to the fact that superior results obtain when two contacting bearing surfaces are employed which are constructed of dissimilar molecular structure, as further explained below, and also to the superior anti-frictional properties of the polymerized ethylene plastic which make it attractive for utilization as one of the two dissimilar plastic materials utilized.

The operation and function of the invention resulting from the cooperation of the various elements can be described as follows: Upper bearing sleeve 26 and lower bearing sleeve 28, have a tight sliding fit in the bore 30 of idler arm 22, remain in a fixed position with reference to the idler arm 22 during operation of the device. Thus, a bearing surface exists between spindle 16 and the inner peripheries of upper bearing sleeve 26 and lower bearing sleeve 28. A nut 20 is tightened on threaded portion 18 of bracket spindle 16, peripheral flange 14 will press upper bearing washer 38 against the upper face of upper bearing sleeve 26. Also, lower bearing washer 38 will be pressed against the bottom face of lower bearing sleeve 28 by retaining washer 40. It has been learned that the surfaces of certain synthetic resins have a lubricative characteristic, and this characteristic is particularly noticeable when there is contact of dissimilar resins. The superiority of the bearing formed by utilizing dissimilar resins instead of identical resins is due to the tendency of the abutting surfaces of two bearing members formed of an identical resin to adhere to each other. This tendency to adhere is in turn believed to be due to the chemical affinity of the identical molecules in the two opposed surfaces which causes them to condense or polymerize with each other under the influence of the pressure and heat which exist during the conditions of operation. On the other hand, if the two bearing surfaces are formed of resins having molecules which differ in structure or chain length, such affinity is reduced or eliminated. One of the novel aspects of this invention involves the application of this lubricating characteristic. Bearing surfaces exist between upper bearing sleeve 26 and upper bearing washer 38, and also between lower bearing sleeve 28 and lower bearing washer 38. Due to the lubricous characteristics, sufficient pressure can be exerted by nut 20 to maintain the bearing assembly in a tight condition, without imparting undue friction to the pivotation of idler arm 22. In this connection it may also be noted that the materials of construction of the bearing sleeves 26 and 28 and washers 38 makes these members slightly plastic and minimizes the possibility of overloading the bearing surfaces when the nut 20 is tightened.

As wear develops between the bearing surfaces existing between upper bearing sleeve 26 and upper bearing washer 38, and the bearing surfaces existing between lower bearing sleeve 28 and lower bearing washer 38, the action of spring 31 is such that a substantially constant pressure or load is maintained on these bearing surfaces. Thereby, slack and play which would normally develop through wear is forestalled by this compensating means, insuring longer service from the bearing mechanism without adjustment.

An important feature of this invention resides in the fact that all bearing surfaces in this invention exist primarily between synthetic resins and secondarily between synthetic resins and metals. Taking advantage of the lubricative characteristics makes supplemental lubrication by grease or oil unnecessary. The primary bearing components are of non-metallic, inert material, and are therefore not subject to corrosive attack by water, mud etc. All bearing components are fitted together by pressure from nut 20, leaving no openings through which dirt or dust can enter to affect the life of the bearing mechanism.

This invention has been described as it particularly applies to bearings encountered in idler arm mechanisms of automobiles. It can be seen that the principles of this invention are readily adaptable to any relatively oscillating member mechanism, whether encountered in vehicles or otherwise. Although this invention has been described with a certain degree of particularity, it is manifest that many changes may be made in the details of construction and arrangements of the components without departing from the spirit or the scope of this disclosure. For example, the shank portions of upper and lower bearing sleeves may be spline connected to the axial opening of the idler arm preventing relative rotation. Accordingly, this invention should be considered not to be limited to the embodiment herein described, but should be limited only by the scope of the appended claims.

We claim:

1. A device for journalling an idler arm on the spindle portion of an idler arm bracket when the hub of the idler arm has a bore therethrough larger in diameter than the spindle, comprising high density synthetic resin bearing sleeve means around the spindle and within the bore of the idler arm hub, said sleeve means being of a size to slidingly fit on the spindle and fit slightly tighter in said bore to move with the idler arm upon pivoting movement of the idler arm, said sleeve means being extended beyond the ends of the hub, and means retaining the idler arm hub in a fixed longitudinal position on the spindle, said last-mentioned means including high density synthetic resin bearing washers contacting the opposite ends of said bearing sleeve means.

2. An idler arm assembly, comprising a bracket having a downwardly extending smooth-surfaced spindle portion and a circumferential flange at the upper end of the spindle portion, an idler arm having a hub portion provided with a bore therethrough, said bore being larger in diameter than said spindle, and bearing means journalling the idler arm hub on said spindle for pivotal movement of the idler arm in a substantially horizontal plane, said bearing means comprising upper and lower high density synthetic resin bearing sleeves in said bore around said spindle, each of said bearing sleeves being of a size to provide a sliding fit thereof on said spindle and a slightly tighter fit thereof in said bore to promote movement of said bearing sleeves with said hub upon pivotation of the idler arm, said bearing sleeves being arranged in said bore to protrude both above and below said hub, a high density synthetic resin washer on said spindle between the upper bearing sleeve and said flange, a high density synthetic resin bearing washer on said spindle below the lower bearing sleeve, and means on the lower end of said spindle providing an upward force on said lower bearing washer to retain said washers in contact with the respective ends of said sleeves and maintain the idler arm hub in a fixed longitudinal position on the spindle.

3. An assembly as defined in claim 2 characterized further to include a helical compression spring around said spindle in said bore between the adjacent ends of said bearing sleeves constantly urging said sleeves into contact with said bearing washers with a substantially constant load.

4. An assembly as defined in claim 3 wherein each of said bearing sleeves has a circumferential flange on the outer end thereof larger in diameter than said bore to contact the respective end of the idler arm hub and limit the movement of said sleeves into said bore against said spring.

5. An assembly according to claim 2 wherein said upper and lower bearing sleeves and said upper and lower bearing washers are composed of dissimilar synthetic resin materials.

6. An assembly according to claim 2 wherein said upper and lower bearing sleeves are composed of a polymerized ethylene material and said upper and lower bearing washers are composed of a polymerized tetrafluoroethylene material.

7. An assembly according to claim 2 wherein said upper and lower bearing sleeves are composed of a polymerized ethylene material and said upper and lower bearing washers are composed of a polymerized amide material.

8. A device for journalling an idler arm on the spindle portion of an idler arm bracket when the hub of the idler arm has a bore therethrough larger in diameter than the spindle, comprising high density synthetic resin bearing sleeve means around the spindle and journaling the idler arm hub on said spindle for pivotal movement of the idler arm in a substantially horizontal plane, said bearing means comprising upper and lower high density synthetic resin bearing sleeves in said bore around said spindle; a resilient member around said spindle in said bore between the adjacent ends of said bearing sleeves constantly urging said bearing sleeves outwardly toward the ends of said hub; said bearing sleeves being arranged in said bore to protrude both above and below said hub; a circumferential flange on the outer end of each of said bearing sleeves, said circumferential flanges each having a larger diameter than said bore to contact the respective end of the idler arm hub and limit the movement of said sleeves into said bore against said resilient member, and high density synthetic resin bearing washers around the spindle in contact with the outer ends of said sleeves retaining said sleeves in position in the idler arm hub.

References Cited in the file of this patent

UNITED STATES PATENTS

| | | |
|---|---|---|
| 2,487,329 | Gerry | Nov. 8, 1949 |
| 2,642,318 | Ricks | June 16, 1953 |
| 2,719,064 | Barnard | Sept. 27, 1955 |
| 2,775,793 | Cotchett | Jan. 1, 1957 |
| 2,809,049 | Carlson | Oct. 8, 1957 |
| 2,816,453 | Frank et al. | Dec. 17, 1957 |
| 2,944,829 | Herbenar | July 12, 1960 |
| 2,952,486 | Reuter et al. | Sept. 13, 1960 |